(12) United States Patent
Yoshida et al.

(10) Patent No.: US 6,647,798 B2
(45) Date of Patent: Nov. 18, 2003

(54) BEARING LOAD MEASURING SYSTEM USING DOUBLE-CYLINDER TYPE CARTRIDGE

(75) Inventors: Makoto Yoshida, Kakuda (JP); Mamoru Oike, Kakuda (JP); Masataka Nosaka, Kakuda (JP); Masataka Kikuchi, Kakuda (JP); Takayuki Sudo, Kakuda (JP); Yoshiaki Watanabe, Kakuda (JP)

(73) Assignee: National Aerospace Laboratory of Japan, Chofu (JP)

( * ) Notice: Subject to any disclaimer, the term of this patent is extended or adjusted under 35 U.S.C. 154(b) by 0 days.

(21) Appl. No.: 10/164,618

(22) Filed: Jun. 10, 2002

(65) Prior Publication Data

US 2002/0194927 A1 Dec. 26, 2002

(30) Foreign Application Priority Data

Jun. 13, 2001 (JP) ........................ 2001-178408

(51) Int. Cl.[7] ................................ G01L 1/00
(52) U.S. Cl. ........................................ 73/781
(58) Field of Search ............................ 73/781, 862.381

(56) References Cited

U.S. PATENT DOCUMENTS 3,561,553 A * 2/1971 Blubaugh .................. 177/168
5,251,493 A * 10/1993 Sipos ...................... 73/862.584
5,311,763 A * 5/1994 Gibbs et al. ..................... 73/9
6,094,980 A * 8/2000 Larson et al. ................. 73/161

OTHER PUBLICATIONS

Beatty, R.F., et al., "Improved Rotor Response of the Uprated High Pressure Oxygen Turbopump for the Space Shuttle main Engine", *Journal of Vibration, Acoustics, Stress, and Reliability in Design.* vol. 111; Apr. 1989; pp. 163–169.

* cited by examiner

*Primary Examiner*—Edward Lefkowitz
*Assistant Examiner*—Andre Allen
(74) *Attorney, Agent, or Firm*—Armstrong, Westerman & Hattori, LLP

(57) ABSTRACT

The bearing load measuring system of the present invention is a bearing load measuring system which uses a bearing cartridge as a load cell to measure the bearing load, wherein the abovementioned bearing cartridge is constructed as a double-cylinder type cartridge consisting of an inside cylindrical part that makes internal contact with the outer race in which the bearing balls, and an outside cylindrical part which is linked to the inside cylindrical part via a ring-form supporting member, and the bearing load is measured by strain gauges that are disposed on the surface of the abovementioned outside cylindrical part.

5 Claims, 6 Drawing Sheets

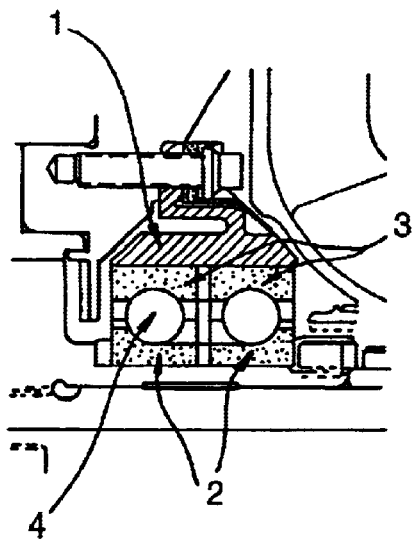
Fig.1
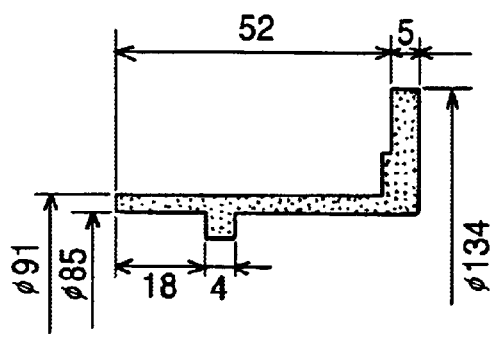
Fig.2
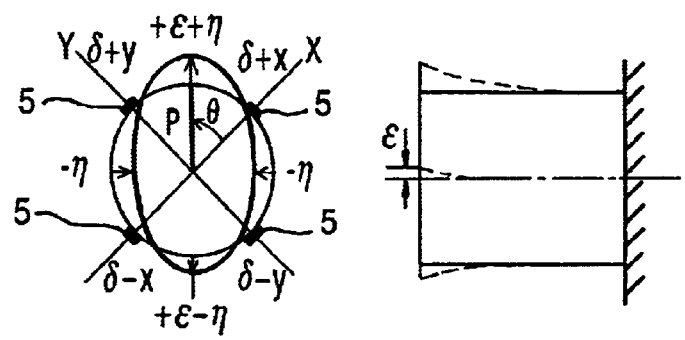
Fig.4  $\varepsilon$: DISPLACEMENT OF   $\eta$: DISPLACEMENT OF
        THE ISOLATOR AXIS    ELLIPTICAL SURFACE DISTORTION

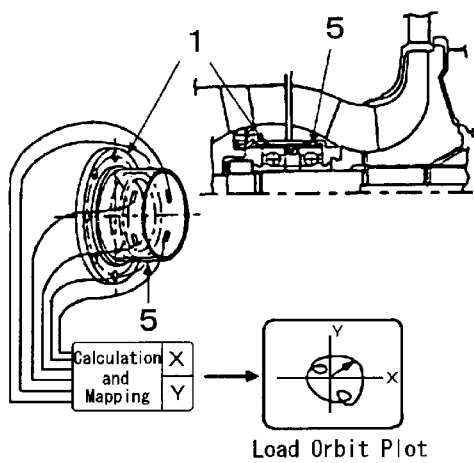
Fig. 3-1
MEASURING SYSTEM of AXIAL LOAD
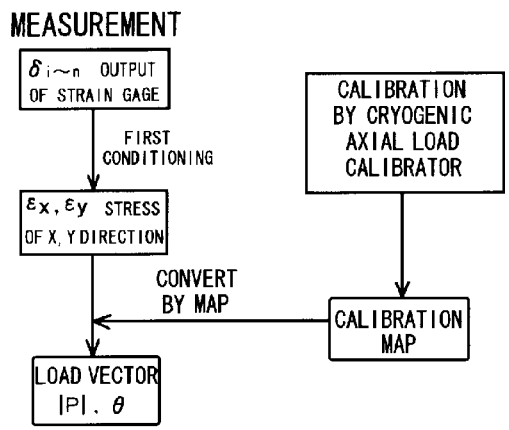
Fig. 3-2
OPERATION OF LOAD VECTOR
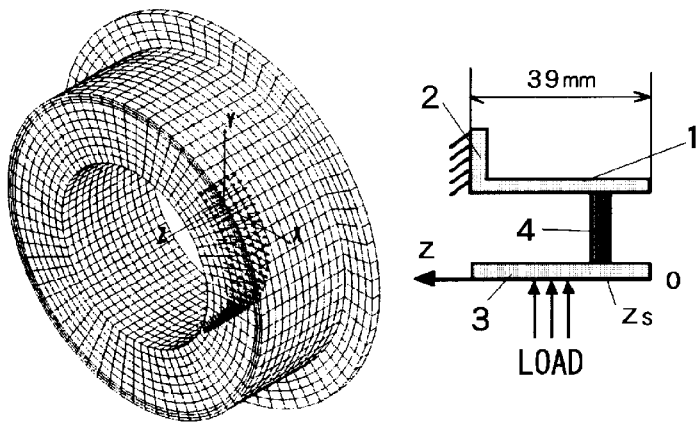
Fig. 5   MODEL
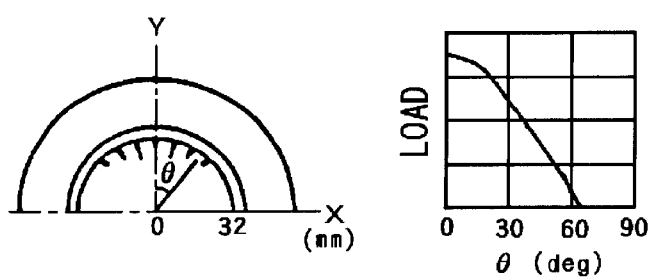
Fig. 6 LOAD CONDITION OF CIRCUIT DIRECTION

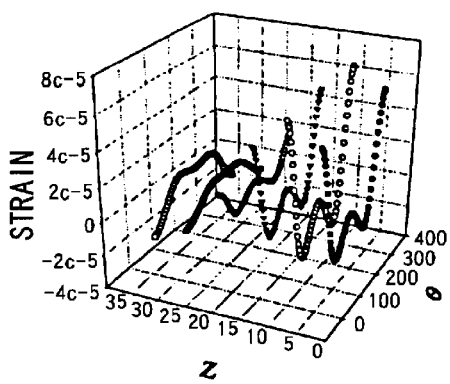
Fig. 7-1
STRAIN OF CIRCUIT DIRECTION
ON CARTRIDGE SURFACE
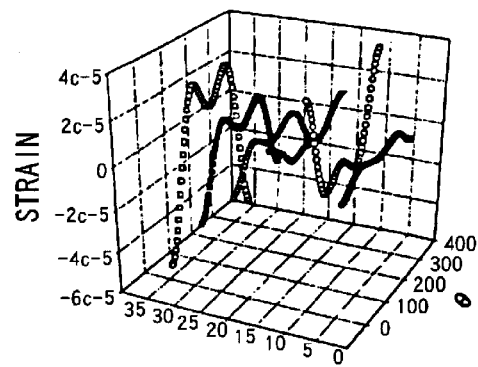
Fig. 7-2
STRAIN OF AXIAL DIRECTION
ON CARTRIDGE SURFACE
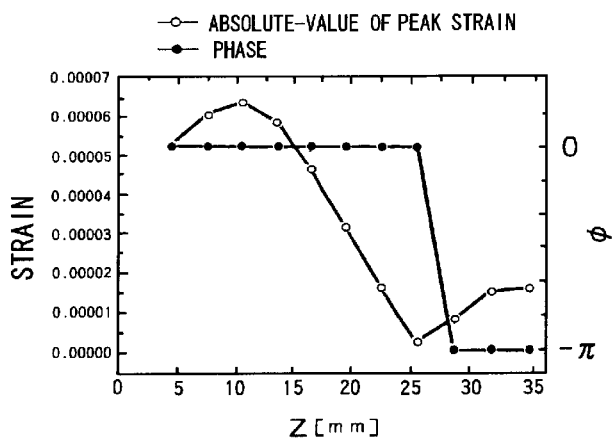
Fig. 8 VARIATION OF STRAIN AND PHASE
ON CARTRIDGE SURFACE
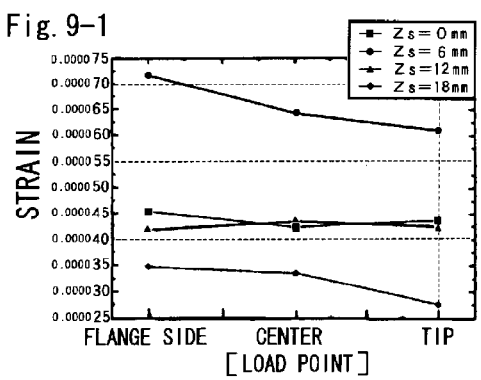
Fig. 9-1
LOAD MOMENT OF CIRCUIT DIRECTION STRAIN
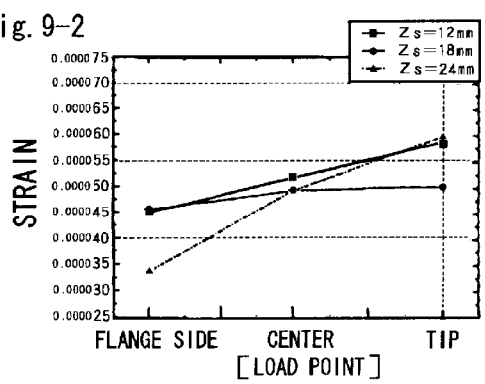
Fig. 9-2
LOAD MOMENT OF AXIAL DIRECTION STRAIN

CALIBRATION AND TEST SET OF AXIAL LOAD

MECHANISM ADDING RADIAL LOAD

BEARING LOAD MEASURING SYSTEM USING DOUBLE-CYLINDER TYPE CARTRIDGE

BACKGROUND OF THE INVENTION

1. Field of the Invention

The present invention relates to a bearing load measuring system for separating and measuring the radial load and load moment acting on bearings in a rotary machine using rotary type bearings that have rolling bodies.

2. Description of the Related Art

Space transport systems that are more economical than the systems currently in use will be required in future space activities, and there is currently a strong demand for the realization of reusable space transport systems. Judging from existing technology, it is realistic to expect that liquid fuel rocket engines will be used as the propulsion systems in such cases. One of the most important constituent elements in such liquid fuel rocket engines is the turbo-pump. In order to realize reusable space transport systems, a higher reliability and longer useful life than those currently seen will be required in such turbo-pumps. However, in the case of rocket turbo-pumps in which smaller size and lighter weight have been pursued in accordance with a desired increase in speed, radial vibration caused by unstable fluid forces is a problem in extending the useful life. The reason for this is that excessive radial vibration causes a drop in durability, and at the same time leads to fatal accidents. Accordingly, it appears that if it were possible to measure the radial load generated by radial vibration, the information obtained by such measurement could be effectively utilized in a soundness monitoring system, or to establish measures for suppressing radial vibration.

The radial load measuring system that is the object of the present invention is a system that uses the bearing cartridge in a turbo-pump as a load cell, and that makes it possible to measure the radial load without causing an increase in weight or any great variation in the vibrational characteristics of the rotary shaft system. Such a technique for measuring the load acting on a bearing utilizing this bearing cartridge has shown results when used in the liquid oxygen turbo-pumps of the main engines of the United States Space Shuttle; however, all of the loads measured have been treated as radial loads. This bearing load measuring cartridge is shown in FIG. 1. The rotating part of the bearing is constructed from an inner race 2 which rotates together with the shaft, and an outer race 3 which is non-rotating together with the bearing cartridge 1, with bearing balls 4 interposed [between the two races]. However, the physical quantity measured in this case is actually a load in which the radial load and load moment are combined; in a conventional system of this type, separate measurement is impossible. Furthermore, in research conducted in the past by the present group of inventors, it was found as a result of investigation in experiments performed using a bearing cartridge (shown in FIG. 2) of more or less the same type as the bearing cartridge in the LE-7 liquid oxygen turbo-pump in the first-stage main engine of the H-2 rocket that the output of the strain gauge tends to be affected by the positions of the bearing balls.

SUMMARY OF THE INVENTION

It is an object of the present invention to provide a system which makes it possible to measure radial loads using the bearing cartridge in a turbo-pump as a load cell without causing any increase in weight or great variation in the vibrational characteristics of the rotary shaft system, wherein the radial load and load moment acting on the bearing can be separately measured without the output of the strain gauge being affected by the positions of the bearing balls.

The bearing load measuring system of the present invention is a system that measures bearing loads using a bearing cartridge as a load cell. This bearing cartridge is constructed as a double-cylinder type cartridge consisting of an inside cylindrical part that contacts the bearing on the inside, and an outside cylindrical part that is connected via a ring-form supporting member. The bearing load is measured by strain gauges that are disposed on the surface of the abovementioned outside cylindrical part. Furthermore, the positions in which the strain gauges are disposed are set as two points at which the phase of the strain is different and the strain is large from the relationship between the amount of strain and the position on the upper surface of the cartridge in the axial direction when a specified load is applied in the radial direction in an analysis by the finite element method, and which satisfy the condition that there is little effect when the load moment is varied by varying the load application point in the axial direction. Moreover, the attachment position in the axial direction of the ring-form member that connects the inside cylindrical part and the outside cylindrical part is determined using the minimal effect of the load moment of the strain in the circumferential direction as a standard.

Furthermore, the number of strain gauges is set as a number consisting of a plurality of sets disposed in the circumferential direction, with each set consisting of a pair of strain gauges in positions in which the phase is different in the axial direction, and the attachment position in the axial direction of the ring-form member that connects the inside cylindrical part and the outside cylindrical part is determined using the minimal effect of the load moment of the strain in the circumferential direction as a standard.

Strain gauges are disposed on the outer surface of the outside cylindrical part in axial positions that receive the maximum effect of the load moment, and the load moment is measured from the difference in output between these strain gauges and strain gauges disposed in positions where the effect of the load moment is minimal.

BRIEF DESCRIPTION OF THE DRAWINGS

FIG. 3-1 shows an outline of the axial load measuring system proposed by the present invention;

FIG. 3-2 shows the flow of calculations from the strain gauge detection output to the calculation of the load vector in the present system;

FIG. 4 is a diagram which shows the displacement on the circumference of the tip end of the cylinder when a load is applied to the tip end;

FIG. 5 shows a calculated model of the newly proposed bearing cartridge shape;

FIG. 6 is a diagram which shows the load distributed in the circumferential direction when a load of 200 [kgf] is applied from above;

FIG. 7 is a graph which shows the results that were obtained when the circumferential strain and axial strain on the upper surface of the cartridge were measured;

FIG. 8 is a graph which shows the relationship between the strain on the upper surface of the cartridge and the phase angle;

FIG. 9 is a graph which shows the effect of the load moment on the strain output when the position Zs of the supporting ring is varied;

FIG. 13-1 is a graph which compares the measured results and calculated results for the strain plotted against the angle θ;

FIG. 13-2 is a graph which shows the relationship between the strain gauge and the ball position;

FIG. 13-3 is a graph which shows the strain versus the load in this case;

FIG. 14-1 is a graph which shows the results that were obtained when a fast Fourier transform (FFT) analysis was performed for the strain measured in the embodiment;

FIG. 14-2 shows a strain map that was prepared by performing a calibration test in an ordinary-temperature environment, and performing a primary treatment;

DESCRIPTION OF THE PREFERRED EMBODIMENTS

Figures 1, 10:
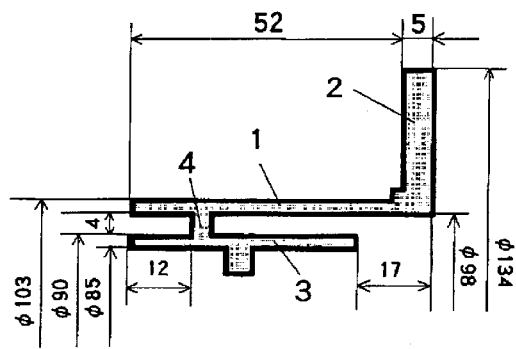
FIG. 1 shows the cartridge used for bear load measurement in the liquid oxygen turbo-pump of the main engine of the United States Space Shuttle.
FIG. 10 shows an embodiment of the double-cylinder type cartridge of the present invention.
Figures 2, 10:
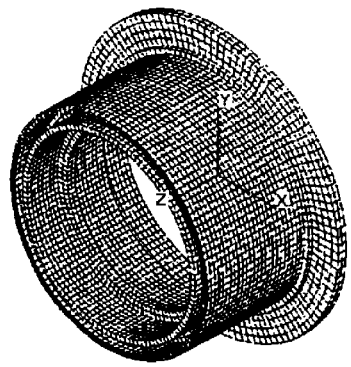
FIG. 2 shows the bearing cartridge in the LE-7 liquid oxygen turbo-pump in the first-stage main engine of the Japanese H-2 rocket.
Figures 1, 13:
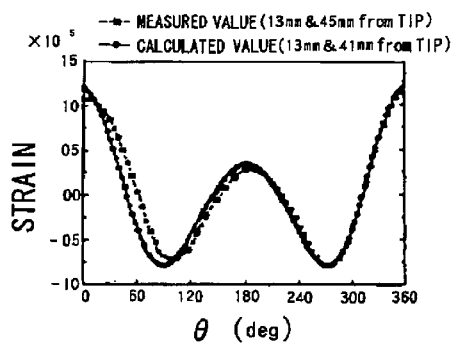
Figures 2, 13:
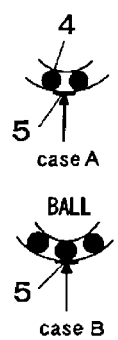
Figures 3, 13:
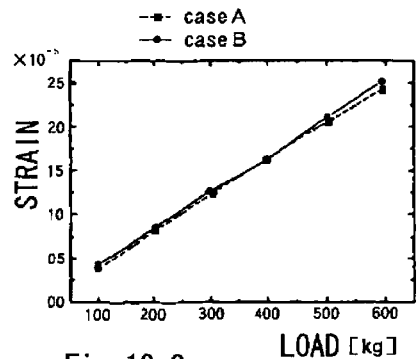

An outline of the radial load measuring system proposed by the present invention is shown in FIG. 3-1. This system is a system in which a plurality of strain gauges 5 are [disposed] in the circumferential direction and pasted to a bearing cartridge 1 that is actually incorporated into a turbo-pump, and the load vector is dynamically measured by subjecting the outputs of the strain gauges to a synthesis treatment with the positional relationship of the gauges controlled. Furthermore, FIG. 3-2 shows the flow of calculations from the detection output of the strain gauges to the calculation of the load vector in the present system. In the present system, in order to compensate for the difference between values obtained in load tests performed on the ground and the strain to which the bearing cartridge is subjected in the case of actual use in a turbo-pump in outer space, it is necessary to prepare a calibration map by means of an axial load calibration test performed beforehand in a cryogenic-temperature environment. Afterward, the bearing cartridge that has been subjected to this calibration test is installed in a turbo-pump, and a high-speed rotation test is performed. Then, the x and y components of the strain quantities are first calculated from the outputs of the plurality of strain gauges. The calculated strain quantities are converted using the calibration map, and the load vector is identified.

Next, the basic output analysis method used to identify the load vector of the radial load in the present invention will be described. In order to identify the load vector of the radial load, it is necessary to clarify the relationship between the local strain quantities of the bearing cartridge and the load vector. Accordingly, as is shown in FIG. 4, one end of the cylinder is fixed, and the displacement of the tip end of the cylindrical part in a case where a load is applied to the other end in the radial direction from the inside is considered. Here, for the sake of simplicity, the orientations of the strain gauges 5 pasted to the circumference of the bearing cartridge 1 at 90-degree intervals are caused to coincide with the x axis and y axis. Furthermore, the angle formed by the load vector P and the x axis is designated as θ. The displacement of the tip end of the cylindrical part caused by the load vector can be approximated as the sum of the displacement ε that involves bending in the load direction in the manner of a cantilever beam, and the amount of displacement η caused by the deformation of the cylindrical cross section into an elliptical shape with the load direction as the major axis. The period of the ε component is $2\pi$, and the period of the η component is $\pi$; accordingly, the outputs δ of the four strain gauges 5 can be expressed by the following equations.

Numerical Expression 1

$$\delta_{+z}(|P|, \theta) = \epsilon_z(|P|, \theta) + \eta_z(|P|, \theta) = C_1(|P|)\cos\theta + C_2(|P|)\cos 2\theta \quad (1)$$

$$\delta_{-z}(|P|, \theta) = \delta_{+z}(|P|, \theta+\pi) = -C_1(|P|)\cos\theta + C_2(|P|)\cos 2\theta \quad (2)$$

$$\delta_{+y}(|P|, \theta) = \epsilon_y(|P|, \theta) + \eta_y(|P|, \theta) = -C_1(|P|\sin\theta - C_2(|P|)\cos 2\theta \quad (3)$$

$$\delta_{-y}(|P|, \theta) = \delta_{+y}(|P|, \theta+\pi) = C_1(|P \sin\theta - C_2(|P|)\cos 2\theta \quad (4)$$

Here, C1 and C2 are coefficients that depend on the load vector. When ε, which has the same phase as the load vector, is separated from δ in order to identify the load vector from the outputs of the strain gauges, the following Equations (5) and (6) are obtained from Equations (1) through (4):

Numerical Expression 2

$$\epsilon_x(|P|, \theta) = C_1(|P|)\cos\theta = \frac{1}{2}(\delta_{+x} - \delta_{-x}) \quad (5)$$

$$\epsilon_y(|P|, \theta) = C_1(|P|)\sin\theta = \frac{1}{2}(\delta_{-y} - \delta_{+y}) \quad (6)$$

Accordingly, according to the assumptions of this analysis, it is generally possible to determine the load vector by combining the outputs of four gauges disposed on the circumference, extracting only the θ components of the displacements, and determining C1 (P) by means of a calibration test.

With the aim of eliminating the effects of the relative positions of the bearing balls and the strain gauges on the gauge outputs, the present inventor optimized the bearing cartridge shape using the finite element method (FEM). FIG. 5 shows a calculated model of the newly proposed bearing cartridge shape. Specifically, one end of an outside cylindrical part 11 with a tube length of 39 mm forms a flange 12 and is fixed, and an inside cylindrical part 13 with the same length of 39 mm is integrally formed by means of a supporting ring in a position in the axial direction Zs from the non-flange end part of the outside cylinder. The inside surface of the abovementioned inside cylindrical part corresponds to the portion that contacts the outer race in which the bearing balls. The elements used are 8-node-point solid elements (small hexahedral). In order to eliminate the effects of the bearing balls, a double-cylinder shape connected by ring-form supporting parts 14 was used. Furthermore, since it is conceivable that the absolute values of the strain outputs might be reduced as a result, a two-gauge method is employed in which the strain gauges are installed in positions where the strain quantity is reversed, and bridges are built in so that the outputs are extracted differentially. Moreover, the calculation conditions were set as follows:

1. The magnitude of the load is 200 [kgf], with the distribution assumed to be a distribution conforming to FIG. 6 for the circumferential direction, and a uniform distribution for the axial direction.
2. Zs is varied at 6 mm intervals from Zs=0 mm to 24 mm.

Here, Zs indicates the position of the supporting ring 4 in the axial direction.

A finite element analysis was performed under the above conditions. Specifically, the results obtained when the circumferential strain and axial strain on the upper surface of the cartridge were calculated are shown in FIG. 7. $\theta$ indicates the angle formed by the strain gauge and load vector [in each case], and Z indicates the position in the axial direction of the cartridge. It is seen from FIG. 7 that if the circumferential strain and axial strain both show values extending into the positive and negative ranges, and two points in the axial direction are appropriately selected, the phase of the $\theta$ component of the strain on the upper surface of the cartridge is shifted by $\pi$, so that the two-gauge method can be appropriately used on the upper surface of the cartridge.

Next, the positions in which the strain gauges are pasted will be investigated. Here, the phase difference between the $\theta$ component of the strain and the load vector is designated as $\phi$. Specifically, $\phi=0 \rightarrow$ the load vector and the $\theta$ component of the strain have the same phase.

$\phi=-\pi \rightarrow$ the load vector and the $\theta$ component of the strain have opposite phases.

FIG. 8 shows the relationship between the position in the axial direction of the cartridge and the phase angle and absolute value of the peak strain. From the standpoint of using the two-gauge method, all models require that the strain gauges be pasted in positions where the S/N ratio shows a maximum value. As a result of an investigation performed in this manner, it was found that both the circumferential strain and the axial strain in each model in which Zs was varied showed the largest positive peak in the vicinity of Zs and the largest negative peak in the vicinity of the flange, as is shown in FIG. 8.

Next, the effects of the offset of the load (load moment) were investigated.

Condition 3. The positions where the load was applied were the following three positions:

In the vicinity of the tip end of the cartridge

In the vicinity of the center of the cartridge

In the vicinity of the flange of the cartridge

An investigation was conducted in order to ascertain how the $\theta$ component of the strain following the primary treatment, i.e., the radius of the constant-load curve on the calibration map, is affected by the load moment. FIG. 9-1 shows the effects of the load moment of the circumferential strain, and FIG. 9-2 shows the effects of the load moment of the axial strain. In FIG. 9, the magnitude of the absolute value of the slope indicates the strength of the effect of the load moment. Accordingly, it is seen from these figures that if the circumferential strain at Zs=12 mm is measured, the radial load can be identified without considering the effect of the load moment. The above investigation indicated that it is appropriate in the case of this model to set the position Zs of the supporting ring 4 at Zs–12 mm; furthermore, the graph in FIG. 8 indicated that the positions on the outer surface of the outside cylindrical part where the strain gauges are pasted should be a combination of a position in the vicinity of Zs where the maximum absolute value of the peak strain is shown, and a position in the vicinity of the flange part where the phase is reversed and the absolute value of the peak strain is large. For the sake of simplicity, it is advisable to install four strain gauges at 90-degree intervals in the circumferential direction, for a total of eight strain gauges installed in the two-gauge method.

Embodiment 1

Figures 1, 11:
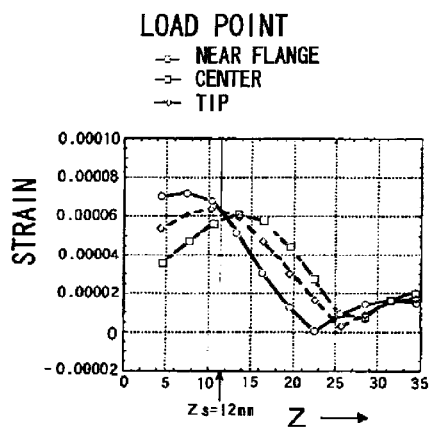
FIG. 11 is a graph which shows the phase distribution and circumferential strain distribution on the surface of the outside cylinder in cases where different load moments are applied.
Figures 2, 11:
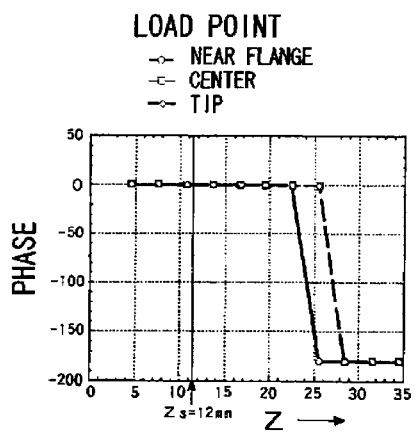

FIG. 10 shows an embodiment of a double-cylinder type cartridge manufactured as a prototype on the basis of the abovementioned analysis method. This cartridge was manufactured in accordance with an external rotational diameter of $\phi$ 85, which is one standard for cartridges of liquid oxygen turbo-pumps. This cartridge is a double-cylinder cartridge obtained by optimizing a cartridge with no supporting part on the end surface by analysis using the finite element method. In this embodiment, as is shown in FIG. 10-1, the tube length of the outside cylindrical part 11 is 57 mm, the internal diameter is $\phi$ 98 mm, the external diameter is $\phi$ 103 mm, the diameter of the flange is $\phi$ 134 mm, and the thickness of the flange is 5 mm. The cartridge has a ring-form supporting part 14 with a thickness of 3 mm that connects with the inside cylindrical part 13 from a position located 12 mm from the tip end portion in the axial direction. The tube length of this inside cylindrical part 13 is 50 mm, the internal diameter is $\phi$ 85 mm, and the external diameter of $\phi$ 90 mm. The cartridge has a structure which is such that the inside surface part contacts respective bearings in the front and rear on both sides of a partition in the central portion with respect to the axial direction. The graph shown in FIG. 11 shows the circumferential strain distribution on the surface of the outside cylinder for three cases in the same cartridge (i.e., in the vicinity of the flange of the cartridge, in the vicinity of the center of the cartridge and in the vicinity of the tip end of the cartridge) in which the radial load is the same and the load moment component is very different. In the vicinity of Z=12 to 13 mm and the vicinity of Z=30 to 32 mm, there are areas that are almost unaffected by the load moment. Furthermore, the phase of the strain in these areas is reversed (tensile strain in the vicinity of Z=12 to 13 mm and compressive strain in the vicinity of Z=30 to 32 mm); accordingly, if a bridge circuit is constructed by combining strain gauges in both of these positions, an amplifying effect based on differential output, and a temperature compensation effect caused by the canceling out of temperature variations, can be simultaneously obtained. Four sets consisting of [a total of] eight strain gauges are disposed on the outer surface of the outside cylindrical part by disposing the strain gauges at 90-degree intervals in the circumferential direction. Furthermore, if strain sensors are also applied to the tip end portion of the outside cylinder which is most susceptible to the effects of the moment, and measurements are simultaneously performed in this area, the load moment can also be measured.

Figures 1, 12:
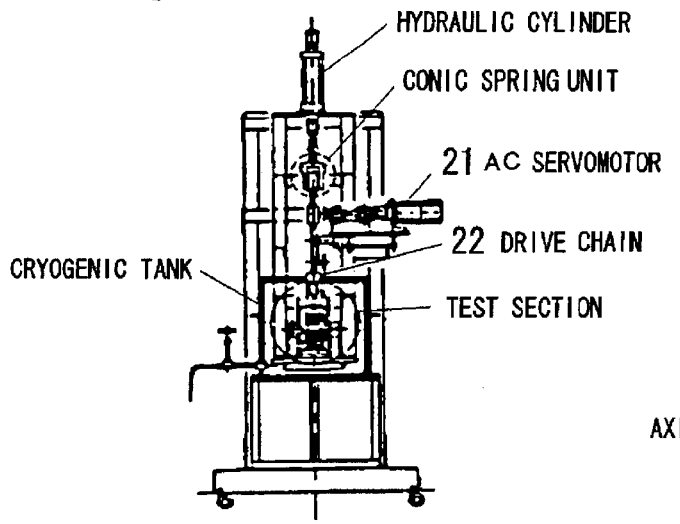
FIG. 12 is a schematic diagram of an axial load calibration and test set for the double-cylinder type cartridge.
Figures 2, 12:
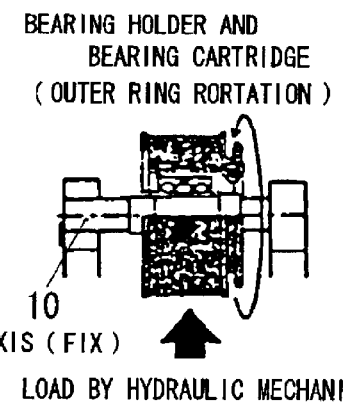

An axial load calibration test was performed on the abovementioned double-cylinder type cartridge. An outline of the test apparatus is shown in FIG. 12. In this apparatus, a shaft 10 is fastened to the apparatus, and a holder which is attached to the bearing cartridge is rotated by means of an AC servo motor 21 via a chain 22 while an upward-oriented load is applied to this holder by hydraulic pressure. Accordingly, a special feature of this apparatus is that the outer race rotates, unlike the case of an actual turbo-pump; viewed in relative terms, however, this would appear to be comparable to an actual turbo-pump. Furthermore, other special features of the present apparatus are that the rpm is set at a low speed of approximately 1.5 [rpm], and that a calibration test in liquid nitrogen can be performed by using a cryogenic tank. FIG. 13-1 shows a comparison of the finite element analysis results and experimental results obtained in a case where the load was 200 [kgf]. Black squares indicate the experimental results that were obtained when strain gauges were installed in positions located 13 mm and 45 mm from the tip end, and black circles indicate the calculated results that were obtained when strain gauges were installed in positions located 13 mm and 41 mm from the tip end. It is seen that both sets of results show extremely good agreement.

Furthermore, the effect of varying the positions of the strain gauges and bearing balls was also investigated using the prototype cartridge of the present embodiment. As is shown in FIG. 13-2, a cases in which the strain gauges were located between the bearing balls was designated as case A, and a case in which the positions of the strain gauges and the bearing balls coincided was designated as case B. The variations in the strain according to the load are shown for the respective cases in FIG. 13-3. Black squares indicate case A, while black circles indicate case B. It is seen from FIG. 13-3 that in the present prototype, variations in the relative positions of the bearing balls and strain gauges have almost no effect on the strain gauge outputs. This is attributable mainly to the attachment position Zs of the ring-form supporting member, and the positions where the strain gauges are pasted also have an effect. With respect to the decrease in the detection signal caused by the use of a double-cylinder structure, the signal sensitivity is heightened by differential detection of the reverse phase signal.

Figures 1, 14:
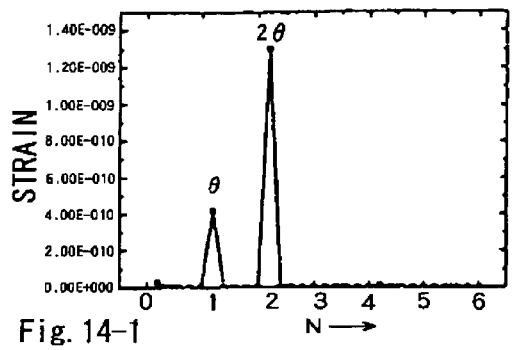
Figures 2, 14:
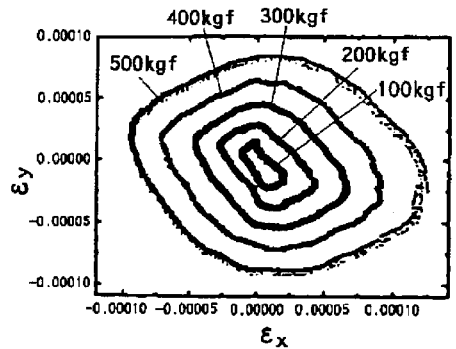

Next, the preparation of a calibration map for the present prototype was attempted. As was described earlier, the term "calibration map" refers to a conversion map which is used to calculate the $\epsilon_x$, and $\epsilon_y$ components from the outputs ($\delta_j$) of the respective strain gauges primary treatment, and to make a conversion from the positions of the intersection points on the horizontal plane, with the $\epsilon_x$ component taken on the horizontal axis and the $\epsilon_y$ component taken on the vertical axis, to the magnitude and direction of the load vector. In order to prepare a calibration map, it is necessary to clarify the number of strain gauges required. Accordingly, the results that were obtained when the amount of strain that was measured in the case of rotation at a constant speed with a specified load applied to the present prototype was subjected to a fast Fourier transform analysis (FFT) are shown in FIG. 14-1. The horizontal axis shows the number of higher harmonics for the rotation frequency. It is seen from FIG. 14-1 that the present prototype has up to two higher harmonic components. Accordingly, since the two-gauge method is used in accordance with the abovementioned output analysis method, it is necessary to use four sets of strain gauges, for a total of eight strain gauges. FIG. 14-2 therefore shows the results that were obtained when a calibration test was performed in an ordinary-temperature environment using four sets of strain gauges, and a calibration map was prepared by performing a primary treatment. The results shown are for a case in which the load was varied in 10 kgf units from 100 kgf to 500 kgf. Ideally, the results should exhibit the form of concentric circles; the reason for the distorted shape is variations in the structure such as the manner of application of the strain gauges and the like. When the bearing cartridge of the present invention is being prepared, it is necessary to prepare calibration maps for the individual cartridges, including maps in ultra-low-temperature environments.

Figures 1, 15:
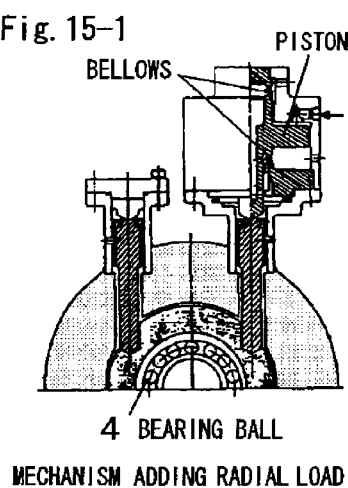
FIG. 15 shows the test conditions used and results obtained in a case where a one-way load was applied to the cartridge of the embodiment by means of a radial-load loading piston.
Figures 2, 15:
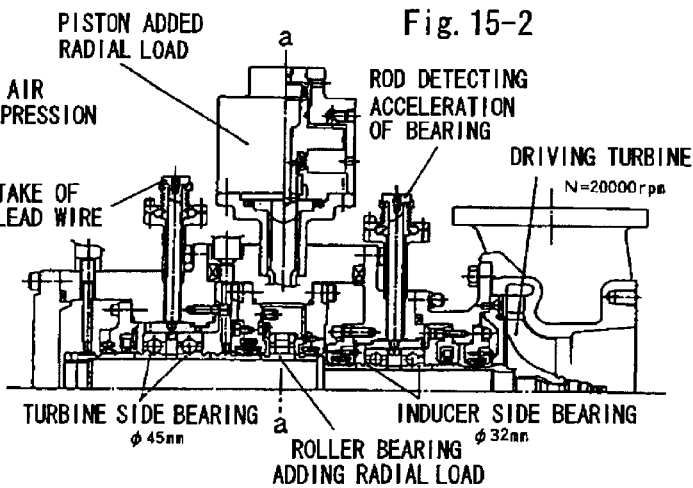
Figures 3, 15:
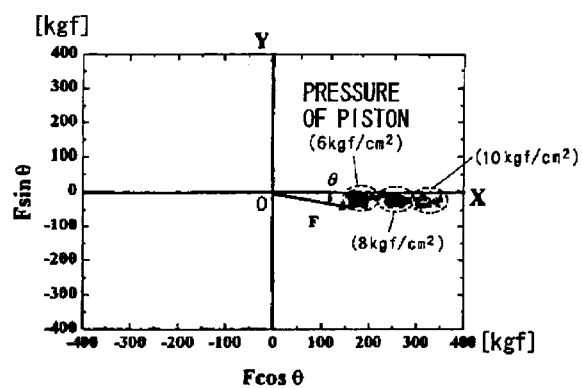
Figures 1, 16:
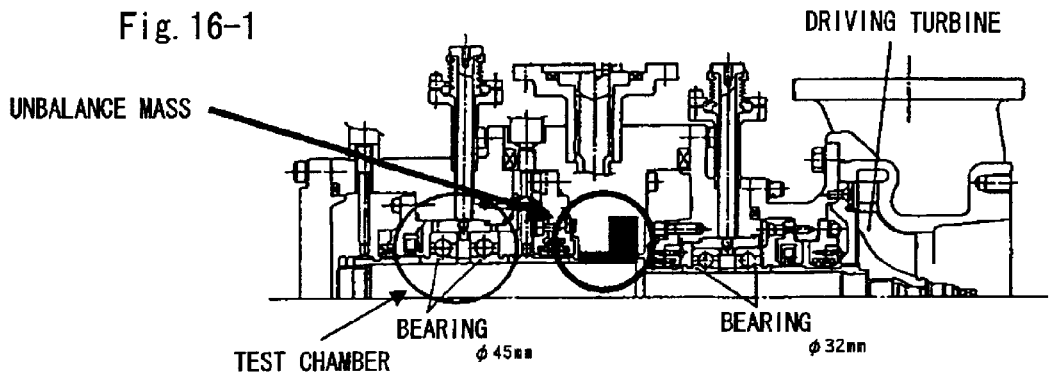
FIG. 16 shows the test conditions used and results obtained in a case where an imbalance mass was caused to rotate at a high speed of 5000 rpm on the cartridge of the embodiment.
Figures 2, 16:
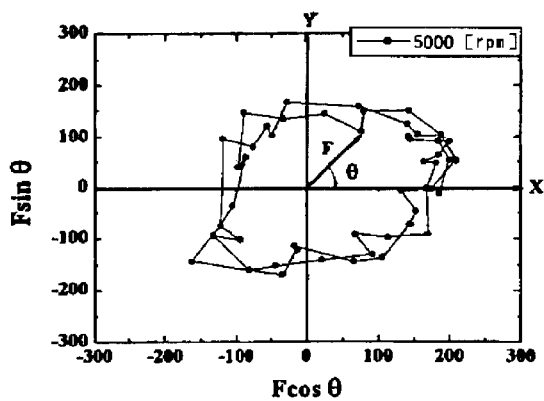

The present prototype was also subjected to a test using a cryogenic-temperature bearing testing apparatus; the results obtained are described below. This test was performed in order to ascertain whether or not correct measured values are shown by the double-cylinder type cartridge of the present embodiment when a unidirectional load is applied to the central portion of the axis of rotation by means of a piston applying a radial load, and in order to ascertain what kind of measured values are shown when an imbalance mass is applied. FIG. 15 shows the test conditions used and results obtained when a unidirectional load was applied by means of a gas pressure type radial load applying piston, and FIG. 16 shows the test conditions used and result obtained when an imbalance mass was applied. In the test shown in FIG. 15, liquid nitrogen was first caused to flow through the bearing so that the double-cylinder type cartridge part was placed in a cryogenic-temperature state, and a pressing force was applied to the outside cylinder part of the double-cylinder type cartridge via two spindles, thus creating a state in which a load was applied to the bearing from above. FIG. 15-2 is a side view, FIG. 15-1 is a sectional view along line a—a, and FIG. 15-3 is a graph showing the measurement results. As is shown in the graph in FIG. 15-3, the measured values obtained from the double-cylinder type cartridge installed in the turbine side bearing when piston pressures of 6 kgf/cm$^2$, 8 kgf/cm$^2$ and 10 kgf/cm$^2$ were applied while the shaft side was rotated in this state are distributed within a specified region. The X axis corresponds to the vertical direction in the apparatus, and the Y axis corresponds to the horizontal direction. In regard to the manner of application of the unidirectional load by the radial load applying piston, a structure was used in which the piston load was applied to only one of the two spindles, with the other spindle being fixed as shown in FIG. 15-1; accordingly, the applied load did not coincide completely with the downward direction (X axis), but rather had a slight inclination at an angle of θ. The fact that the measured values do not show a fixed value (point) for all directions of rotation, but instead form a group distributed within a specified region, is interpreted as being attributable to the fact that rotation-synchronized vibration is generated by a slight imbalance of the shaft system, and to the fact that there is also a slight residual effect of the difference between the abovementioned case in which the strain gauges are disposed between the bearing balls and the case in which the positions of the strain gauges and the bearing balls coincide in the present embodiment as well.

FIG. 16 shows the test conditions that were used when an imbalance mass was applied. As is seen from the side view shown in FIG. 16-1, the imbalance mass was applied to the upper portion in the figures. This imbalance mass applies rotates together with the shaft, and applies a centrifugal force to the central portion of the axis of rotation. As in the previous test, the double-cylinder type cartridge part was placed in a cryogenic-temperature state by causing liquid nitrogen to flow through the bearing. The measured values that were obtained when this imbalance mass was caused to rotate at a high speed of 5000 rpm are shown in a graph in FIG. 16-2. In this graph, the measured values for two revolutions in a stable rotating state are plotted on graph coordinates. The fact that these measured values for two rotations show some variation with respect to the θ value is also interpreted as being attributable to the fact that the positions of the strain gauges and bearing balls have a different effect in each revolution.

It was confirmed from the above tests that a system that overcomes the problems of a conventional apparatus, and that makes it possible to measure the radial load and load moment acting on the bearing separately with the outputs of the strain gauges being almost unaffected by the positions of the bearing balls, can be provided.

The bearing load measuring system of the present invention is a system that uses a bearing cartridge as a load cell to measure the bearing load in rotary machines that use radial bearings that have bearing balls. This bearing cartridge is constructed as a double-cylinder type cartridge comprising an inside cylindrical part that contacts the bearing from the inside, and an outside cylindrical part that is connected to the inside cylindrical part via a ring-form supporting member. Since the bearing load is measured by means of strain gauges that are disposed on the surface of the abovementioned outside cylindrical part, detection that is unaffected by variation in the relative positions of the bearing balls of the bearing and the strain gauges can be performed.

Furthermore, by setting the positions in which the strain gauges are disposed in the axial direction as two points at which the phase of the strain is different and the strain is large from the relationship between the amount of strain and the position on the upper surface of the cartridge in the axial direction when a specified load is applied in the radial direction in an analysis by the finite element method, and which satisfy the condition that there is little effect when the load moment is varied, it is possible to accomplish high-sensitivity detection that is almost unaffected by the load moment, and that is based on the two-point gauge method.

Furthermore, by setting the number of strain gauges as a number consisting of a plurality of sets disposed in the circumferential direction, with each set consisting of a pair of strain gauges in positions in which the phase is different in the axial direction, it is possible to prepare a calibration map by testing.

In the present invention, the attachment position in the axial direction of the ring-form member that connects the inside cylindrical part and the outside cylindrical part is determined using the minimal effect of the load moment of the strain in the circumferential direction as a standard; accordingly, the magnitude of the radial load can be determined in a manner that is almost unaffected by the load moment.

Furthermore, the load moment can be measured by disposing strain gauges on the outer surface of the outside cylindrical part in positions with respect to the axial direction that are most susceptible to the effect of the load moment, and comparing the outputs of these strain gauges with the outputs of strain gauges disposed in positions where the effect of the load moment is minimal. Specifically, it has been shown that the radial load and load moment acting on the bearing can be separately measured by means of a bearing load measuring system using a double-cylinder type cartridge.

The cartridge of the present invention allows the separate measurement of the bearing load values without making any sacrifices in terms of weight or space; accordingly, if the cartridge of the present invention is used in aerospace bearings in which miniaturization and weight reduction are pursued to an extreme degree especially in rocket turbo-pumps and the like, various forces acting on such bearings can be measured directly and separately, so that valuable information for specifying the causes of radial vibration problems can be obtained. At the same time, the reliability of such turbo-pumps can be greatly improved compared to conventional techniques, so that a major path to future reuse is opened.

What is claimed is:

1. A bearing load measuring system comprising a bearing cartridge as a load cell to measure the bearing load in a rotary machine using a radial bearing that has bearing, wherein said bearing cartridge is constructed as a double-cylinder type cartridge consisting of an inside cylindrical part that makes internal contact with the outer race in which the bearing balls, and an outside cylindrical part which is linked to the inside cylindrical part through a ring-form supporting member, and the bearing load is measured by strain gauges that are disposed on the surface of said outside cylindrical part.

2. The bearing load measuring system according to claim 1, wherein the positions in which the strain gauges are disposed are set as two points at which the phase of the strain is different and the strain is large from the relationship between the amount of strain and the position on the upper surface of the cartridge in the axial direction when a specified load is applied in the radial direction in an analysis by the finite element method, and which satisfy the condition that there is little effect when the load moment is varied by varying the load application point in the axial direction.

3. The bearing load measuring system according to claim 2, wherein the number of strain gauges is a number consisting of a plurality of sets disposed in the circumferential direction, with each set consisting of a pair of strain gauges in positions in which the phase is different in the axial direction.

4. The bearing load measuring system according to any of claims 1 through 3, wherein the attachment position in the axial direction of the ring-form supporting member that links the inside cylindrical part and the outside cylindrical part is determined so that the effect of the load moment of the strain in the circumferential direction is minimal.

5. The bearing load measuring system according to claim 4, wherein strain gauges are disposed on the outer surface of the outside cylindrical part in axial positions that receive the maximum effect of the load moment, and the load moment is measured from the difference in output between these strain gauges and strain gauges disposed in positions where the effect of the load moment is minimal.

* * * * *